(12) United States Patent
Lee et al.

(10) Patent No.: US 9,197,353 B2
(45) Date of Patent: Nov. 24, 2015

(54) WAVELENGTH SELECTION AND CONFIGURATION METHOD FOR MULTI-WAVELENGTH OPTICAL COMMUNICATION SYSTEM

(71) Applicant: Electronics and Telecommunications Research Institute, Daejeon-si (KR)

(72) Inventors: Dong-Soo Lee, Seoul (KR); Sung-Chang Kim, Gwangju-si (KR); Geun-Yong Kim, Gwangju-si (KR); Hark Yoo, Gwangju-si (KR); Young-Suk Lee, Gwangju-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 0 days.

(21) Appl. No.: 14/038,420

(22) Filed: Sep. 26, 2013

(65) Prior Publication Data

US 2014/0270779 A1 Sep. 18, 2014

(30) Foreign Application Priority Data

Mar. 14, 2013 (KR) ........................ 10-2013-0027576

(51) Int. Cl.
*H04J 14/02* (2006.01)

(52) U.S. Cl.
CPC ........... *H04J 14/025* (2013.01); *H04J 14/0252* (2013.01)

(58) Field of Classification Search
CPC .......................... H04J 14/025; H04J 14/0252
USPC .......................................................... 398/72
See application file for complete search history.

(56) References Cited

U.S. PATENT DOCUMENTS

| 8,224,190 B2 | 7/2012 | Chung et al. | |
| 2009/0290873 A1* | 11/2009 | Takita et al. | 398/59 |
| 2011/0085795 A1* | 4/2011 | Ozaki | 398/25 |

FOREIGN PATENT DOCUMENTS

| KR | 10-2004-0077250 | 9/2004 |
| KR | 10-2010-0070686 | 6/2010 |

\* cited by examiner

*Primary Examiner* — Nathan Curs
(74) *Attorney, Agent, or Firm* — Kile Park Reed & Houtteman PLLC

(57) ABSTRACT

Provided is an OLT including a wavelength splitter that splits all upstream optical signals with different wavelengths received from at least one ONU according to wavelength, at least one receiver that receive the optical signals split by the wavelength splitter according to wavelength, a wavelength selector that allocates an upstream transmission wavelength of the at least one ONU, and a transmitter that transmits wavelength allocation information allocated by the wavelength selector to the at least one ONU.

15 Claims, 5 Drawing Sheets

WAVELENGTH SELECTION AND CONFIGURATION METHOD FOR MULTI-WAVELENGTH OPTICAL COMMUNICATION SYSTEM

CROSS-REFERENCE TO RELATED APPLICATION

This application claims the benefit under 35 U.S.C. §119 (a) of Korean Patent Application No. 10-2013-0027576, filed on Mar. 14, 2013, the entire disclosure of which is incorporated herein by reference for all purposes.

BACKGROUND

1. Field

The following description relates to an optical communication system, and more particularly to a wavelength selection and configuration method for multi-wavelength optical communication system.

2. Description of the Related Art

Optical access network technologies actively under discussion may be divided into Time Division Multiplexing Passive Optical Network (TDM-PON) technology and Wavelength Division Multiplexing Passive Optical Network (WDM-PON) technology. The Time Division Multiplexing Passive Optical Network (TDM-PON) has a structure in which an Optical Line Termination (OLT) and a plurality of Optical Network Units (ONUs) are connected through a passive optical power splitter, and a single transmission wavelength is shared by a plurality of Optical Network Units (ONUs) in an optical layer. In the Time Division Multiplexing Passive Optical Network (TDM-PON), downstream data transmission is performed by a time division multiplexing scheme and upstream data transmission is performed by a Time Division Multiple Access (TDMA) scheme.

In the Wavelength Division Multiplexing Passive Optical Network (WDM-PON), an Optical Line Termination (OLT) and a plurality of Optical Network Units (ONUs) are connected through a passive optical wavelength splitter, and the plurality of Optical Network Units (ONUs) are connected to the OLT using a plurality of wavelengths allocated separately to each ONU. In the Wavelength Division Multiplexing Passive Optical Network (WDM-PON), upstream and downstream data transmission is performed by a wavelength division multiplexing scheme.

In the conventional optical network technology, a predetermined wavelength is used.

That is, in the conventional optical network system, regardless of a quantity of usage bandwidth, all wavelength channels are used all the time from installation. For example, in the Time-division multiplexing Passive optical network (TDM-PON), upstream and downstream data transmissions each use one wavelength, while in the Wavelength-division multiplexing Passive optical network (WDM-PON), upstream and downstream data transmissions have been performed through a plurality of channels using optical wavelengths predetermined for each channel, always using all wavelengths allocated for each channel regardless of actual usage bandwidth.

However, in a future optical communication system, it will be necessary to change the number of used channels according to a bandwidth to be used. Accordingly, the number of used channels should be changed such that fewer channels are used when the bandwidth is narrow, and more channels are used when the bandwidth increases.

For example, in an optical network, one channel is used in an initial stage depending on a number of subscribers, and thereafter, a second channel is used when the scale exceeds the certain number of subscribers. Accordingly, in an optical communication system, energy consumption can be reduced by preventing channels from being unnecessarily used and using bandwidth effectively. Especially, in the TDM-PON, a receiver should satisfy a characteristic of receiving upstream signals in a burst mode, so bandwidth cannot be increased easily. Therefore, it is advantageous to use a plurality of wavelengths for increasing bandwidth for upstream signals and it is required to increase upstream bandwidth according to demand when increasing bandwidth using a plurality of wavelengths.

SUMMARY

The present invention provides a device and method for selecting, in an optical terminal, a wavelength to be allocated to an optical network unit according to a network state condition including a transmission bandwidth used and positions of subscribers in an optical communication system, and setting the wavelength allocated to the optical network unit.

Figure 1:
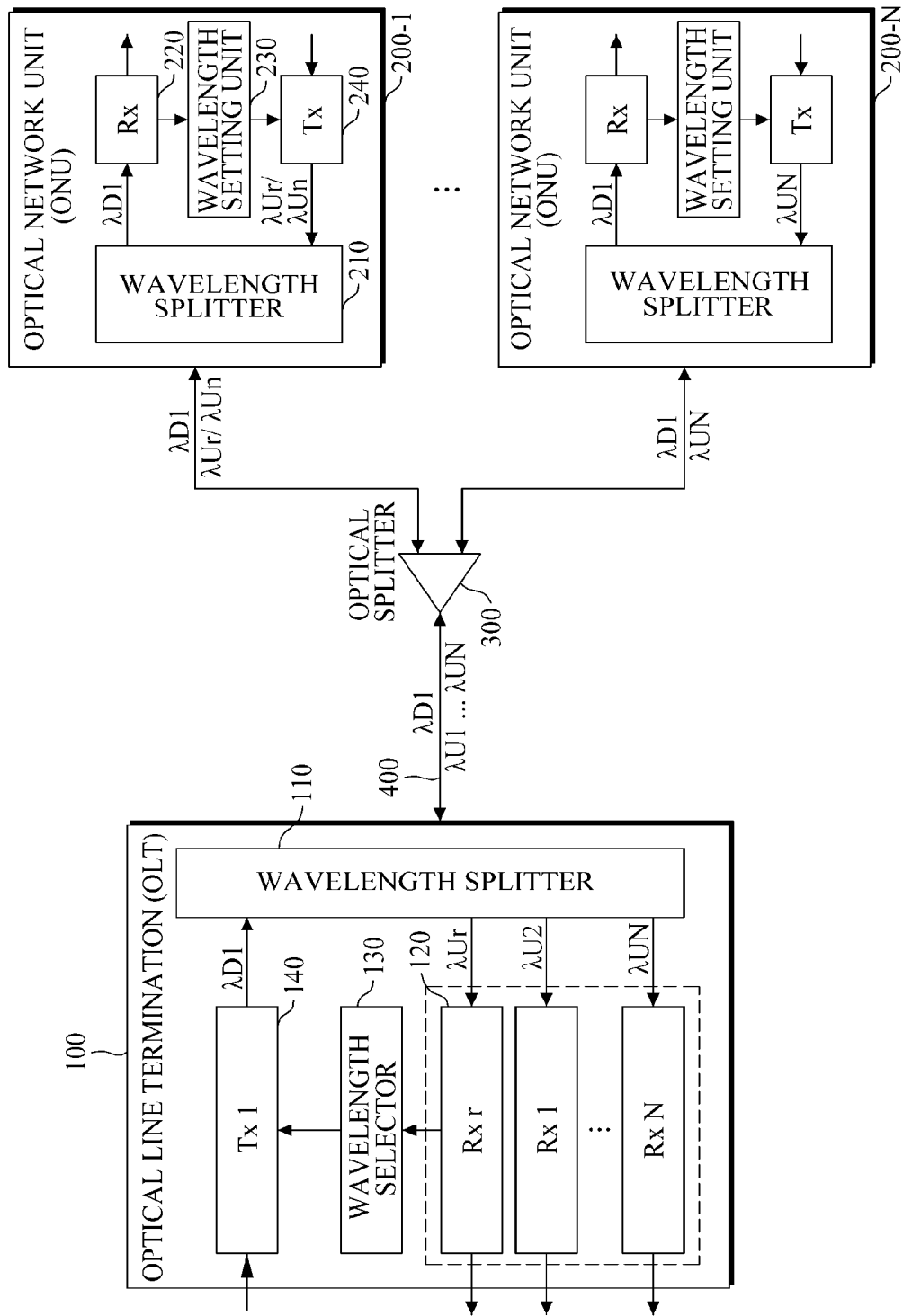
FIG. 1 is a diagram illustrating a configuration of a Time-Division Multiplexing Passive Optical Network (TDM-PON) according to an embodiment of the present invention.

Throughout the drawings and the detailed description, unless otherwise described, the same drawing reference numerals will be understood to refer to the same respective elements, features, and structures. The relative size and depiction of these elements may be exaggerated for clarity, illustration, and convenience.

DETAILED DESCRIPTION

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

FIG. 1 is a diagram illustrating a configuration of a Time-Division Multiplexing Passive Optical Network (TDM-PON) according to an embodiment of the present invention.

With reference to FIG. 1, a plurality of Optical Network Units (ONU) 200-1, to 200-N are connected to one Optical Line Termination (OLT) 100. The OLT 100 and the plurality of ONUs 200-1 to 200-N are connected by an optical splitter 300.

The OLT 100 is a component that integrates and monitors all optical signals from subscribers in a passive optical network system. The OLT 100 provides ONUs 200-1 to 200-N corresponding to a plurality of service subscribers with service nodes, such as a broadcast service node, a Video On Demand (VOD) service node, and an Internet service node. The OLT 100, according to the present invention, may receive optical signals $\lambda u1$ to $\lambda un$ through a plurality of receivers, respectively.

The optical splitter 300 performs a role of splitting optical signals between the OLT 100 and ONUs. The optical splitter 300 may use a multiplexing method such as Time Division Multiplexing (TDM) and Wavelength Division Multiplexing (WDM).

The ONUs 200-1 to 200-N are connected to the OLT 100 in a tree structure, and the number of ONUs connected to one OLT 100 is determined according to a split factor of the optical splitter 300. The ONUs controls the conversion between optical signals and electrical signals from the subscribers for optical communication. Each of the ONUs are connected to terminals of the subscribers (not illustrated) through a VDSL modem or an Ethernet interface.

With reference to FIG. 1, the OLT 100 includes a wavelength splitter 110, receivers (Rx) 120, a wavelength selector 130, and a transmitter (Tx) 140.

The wavelength splitter 110 receives all upstream optical signals $\lambda u1$ to $\lambda un$ with different wavelengths which are received from ONUs 200-1 to 200-N through one optical fiber 400, and splits and outputs the received signals according to wavelength.

The plurality of receivers (Rx) 120 are provided according to a number of upstream wavelengths (N). The receivers 120 receive the plurality of signals split by the wavelength splitter 110 according to wavelength. Photodiodes (PD) may be used as the receivers 120.

The wavelength selector 130 allocates an upstream transmission wavelength to the ONUs 200-1 to 200-N. The wavelength selector 130 selects a wavelength $\lambda Un$ to be allocated based on a combination of network state information of a corresponding ONU in response to a request for wavelength allocation of an ONU to which an upstream transmission wavelength has not been allocated, or a request for wavelength allocation setting of an ONU operated by an operator, and allocates the corresponding wavelength to the ONU. Here, the network state information may include at least one of a quantity of transmission bandwidth in use according to wavelength, a position of the corresponding ONU, and distance information.

Further, the wavelength selector 130 adds a quantity of transmission bandwidth to be used by an ONU to which a wavelength is allocated (initially configured with an estimated value) to a quantity of transmission bandwidth in use by ONUs with wavelengths already allocated, and allocates a new wavelength if the sum of the quantity of transmission bandwidth to be used by the corresponding ONU and the quantity of transmission bandwidth in use by the already wavelength-allocated ONUs exceeds the allowed transmission bandwidth for the wavelength (or a threshold value allowed to the wavelength). However, if the sum of the quantity of transmission bandwidth to be used by the corresponding ONU and the quantity of transmission bandwidth currently in use by the already wavelength-allocated ONUs does not exceed the allowed transmission bandwidth for the wavelength, the wavelength selector 130 selects a wavelength with the minimum quantity of transmission bandwidth among upstream transmission wavelengths currently in use.

Further, the wavelength selector 130 calculates a value of a transmission distance to an ONU to which a wavelength is allocated, compares the value with existing values of transmission distances of ONUs according to upstream transmission wavelength, and selects an upstream transmission wavelength for which the comparison yields a small difference. For example, the selection decreases a difference in powers of upstream signals input to a receiver of an OLT that operates in a burst mode in a TDM-PON, so that a signal input dynamic range of an optical receiver is decreased and performance is improved.

The transmitter (Tx) 140 transmits allocation information on the wavelengths allocated by the wavelength selector 130 to the ONUs 200-1 to 200-N through the optical fiber 400. Further the transmitter (Tx) can be extended to one or more transmitters, or can be extended so that wavelength conversion can be performed. That is, one or more downstream channels that can transmit information from the OLT 100 to the ONUs 200-1 to 200-N can be provided for downstream transmission.

An ONU to which an upstream transmission wavelength has not been allocated makes a request for wavelength allocation to the OLT 100 through a predetermined upstream wavelength $\lambda Ur$.

With reference back to FIG. 1, at least one ONU among ONUs 200-1 to 200-N includes a wavelength splitter 210, a receiver (Rx) 220, a wavelength setting unit 230, and a transmitter (Tx) 240.

The wavelength splitter 210 splits upstream wavelengths and downstream wavelengths so that upstream signals and downstream signals do not interfere with each other. That is, the wavelength splitter 210 receives the downstream wavelength, outputs the received downstream wavelength to the receiver (Rx) 220, and receives the upstream wavelength from the transmitter (Tx) 240, outputs the received upstream wavelength to the optical splitter (300). With the wavelength splitter 210, the downstream wavelength and the upstream wavelength can be communicated through a single optical fiber in a bi-directional manner.

The receiver 220 receives allocation information on the upstream transmission wavelength from the OLT 100. The wavelength setting unit 230 performs control so that the upstream transmission wavelength of the transmitter 240 is set to the wavelength included in the allocation information for upstream transmission received by the receiver 220.

The transmitter 240 transmits data through the upstream transmission wavelength. Further, according to the embodiments of the present invention, the transmitter 240 may request allocation of an upstream transmission wavelength under the control of the wavelength setting unit 230.

When the ONU has been allocated to a new wavelength, it sets the wavelength when data is not transmitted. For example, since an ONU in the TDM-PON transmits upstream optical signals only in a time section allocated to transmit signals in a burst mode, and does not transmit optical signals in other time sections, the wavelength is set in the time section in which optical signals are not transmitted. When the upstream transmission bandwidth is allocated in the OLT 100, information on the wavelength setting time can be transmitted to the ONU.

Figure 2:
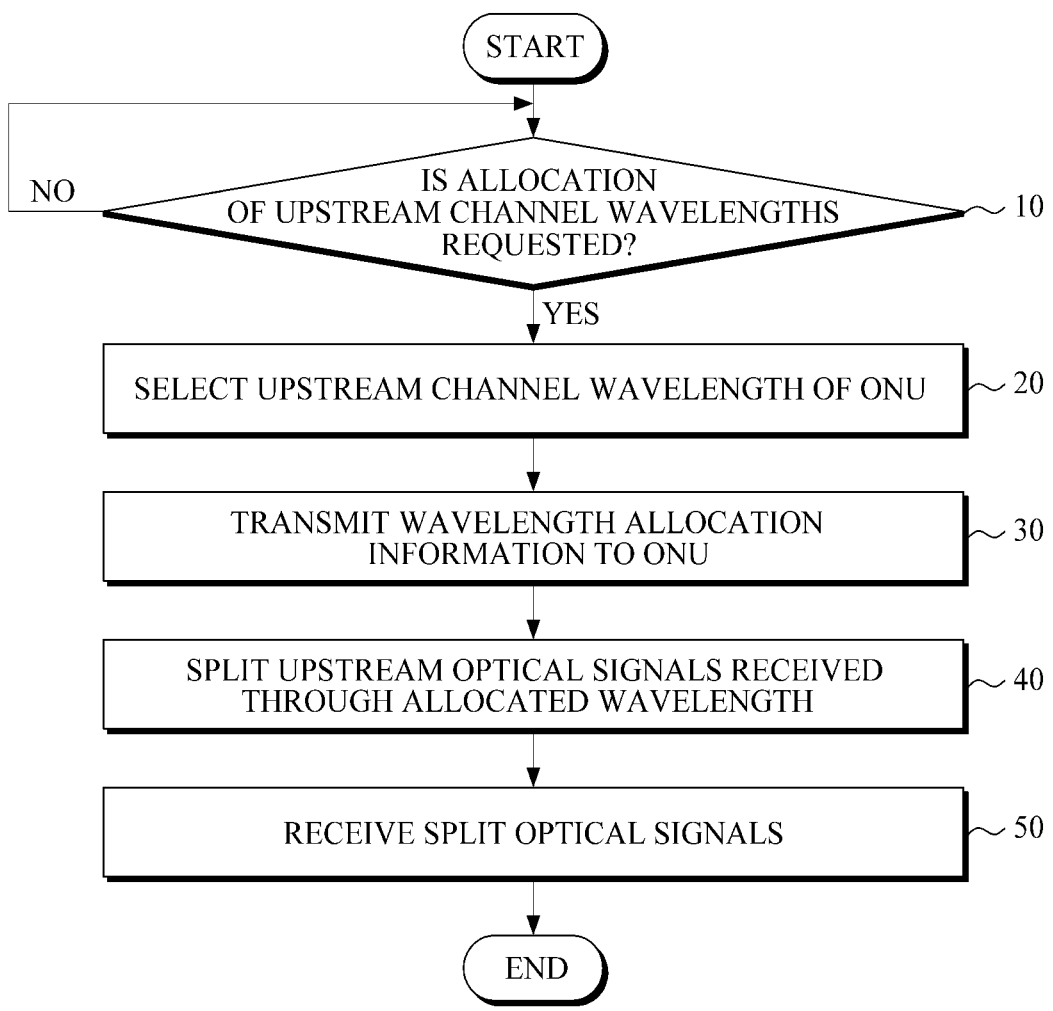
FIG. 2 is a flowchart illustrating a method of allocating an upstream transmission wavelength according to an embodiment of the present invention.

FIG. 2 is a flowchart illustrating a method of allocating an upstream transmission wavelength according to an embodiment of the present invention.

With reference to FIG. 2, the OLT 100 determines whether allocation of an upstream channel wavelength is requested, in step 10. The request for allocation of an upstream channel wavelength may be a request for allocation of a wavelength through a predetermined upstream transmission wavelength from the ONU to which a wavelength has not been allocated, or may be a request from an (ONU) operator.

The OLT 100 selects a wavelength to be allocated to at least one ONU, in step 20. At this point, the upstream transmission wavelength to be allocated is selected according to the state information of the corresponding network of a corresponding ONU. Here, the state information of the network includes at least one of quantity of transmission bandwidth currently in use according to wavelength, a position of the corresponding ONU, and distance information. Various embodiments are possible for selecting operations, and some will be described later with reference to FIGS. 3 and 4. Wavelength allocation information is transmitted to the ONU through an optical fiber, in step 30.

Further, the OLT 100 splits upstream optical signals received through the optical fiber from the at least one ONU into optical signals according to wavelength in step 40. Further, a plurality of split signals is received, in step 50.

Figure 3:
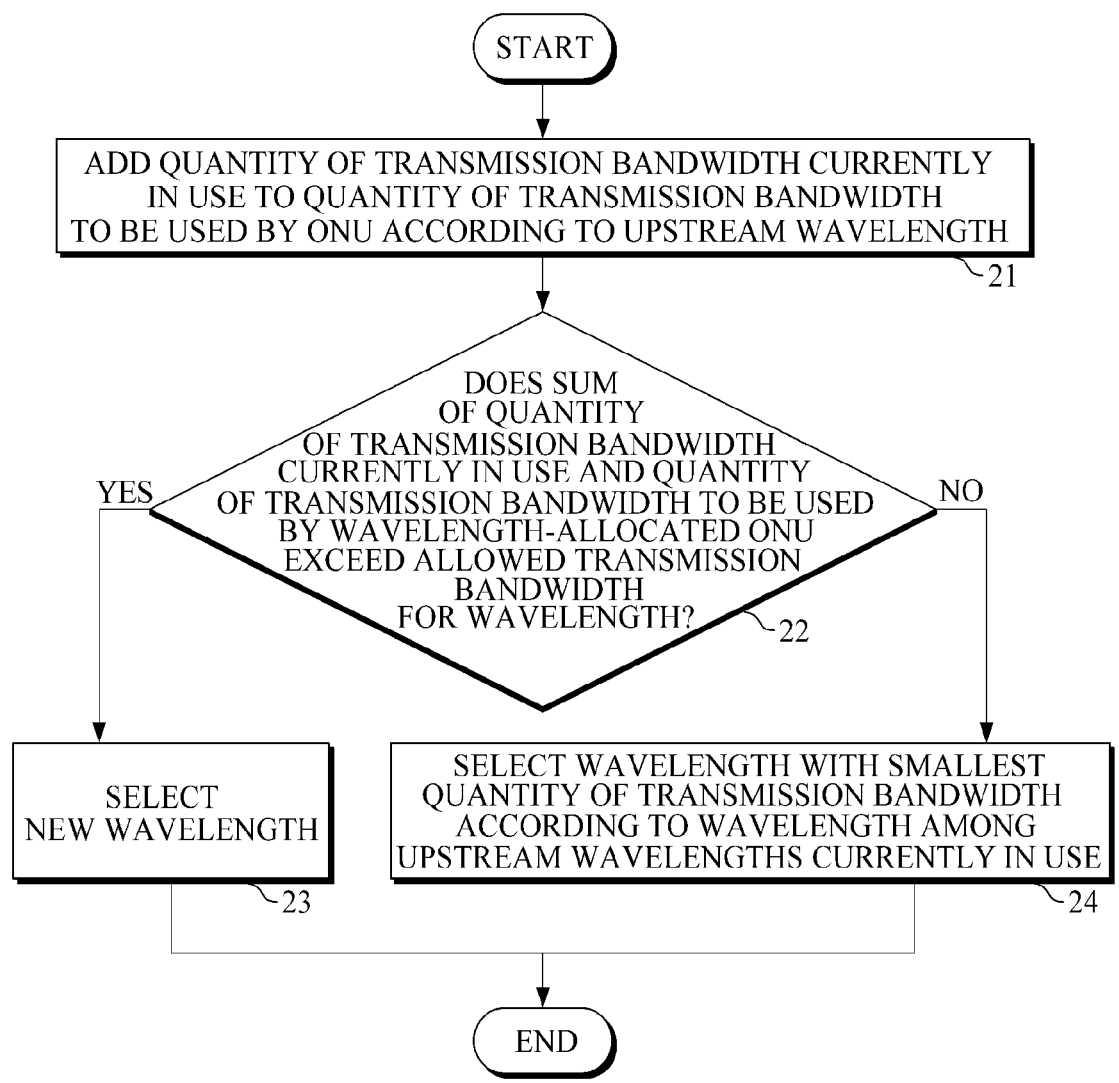
FIG. 3 is a diagram illustrating a method for selecting an upstream transmission wavelength according to an embodiment of the present invention.

FIG. 3 is a diagram illustrating a method for selecting an upstream transmission wavelength according to an embodiment of the present invention.

The OLT 100 adds a quantity of transmission bandwidth used by an ONU to which a wavelength is allocated to a quantity of transmission bandwidth currently in use, in step 21.

Further, the OLT 100 determines whether the sum of the quantity of transmission bandwidth to be used by the corresponding ONU and the quantity of transmission bandwidth in use by the already wavelength-allocated ONUs exceeds the transmission bandwidth allowed for the wavelength, in step 22.

According to the determination result of step 22, if the sum of the quantity of transmission bandwidth to be used by the corresponding ONU and the quantity of transmission bandwidth in use by the already wavelength-allocated ONUs exceeds the allowed transmission bandwidth for the wavelength, the OLT 100 selects a new wavelength in step 23. However, according to the determination result of step 22, if the sum of the quantity of transmission bandwidth to be used by the corresponding ONU and the quantity of transmission bandwidth in use by the already wavelength-allocated ONUs does not exceed the allowed transmission bandwidth for the wavelength, the OLT 100 selects a wavelength with the smallest quantity of the transmission bandwidth among upstream transmission wavelengths currently in use, in step 24.

Figure 4:
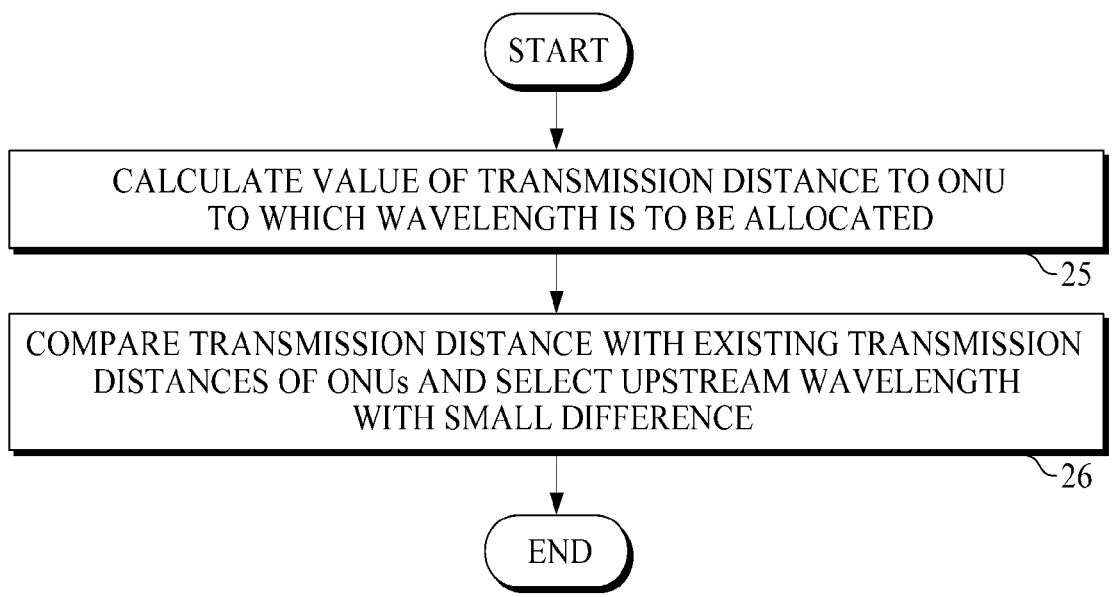
FIG. 4 is a diagram illustrating a method for selecting an upstream transmission wavelength according to another embodiment of the present invention.

FIG. 4 is a diagram illustrating a method for selecting an upstream transmission wavelength according to another embodiment of the present invention.

The OLT 100 calculates a value of a transmission distance to an ONU to which a wavelength is to be allocated in step 25. In addition, the OLT 100 compares the transmission distance with existing transmission distances of ONUs according to upstream transmission wavelength and selects an upstream transmission wavelength for which the comparison yields a small difference, in step 26.

Figure 5:
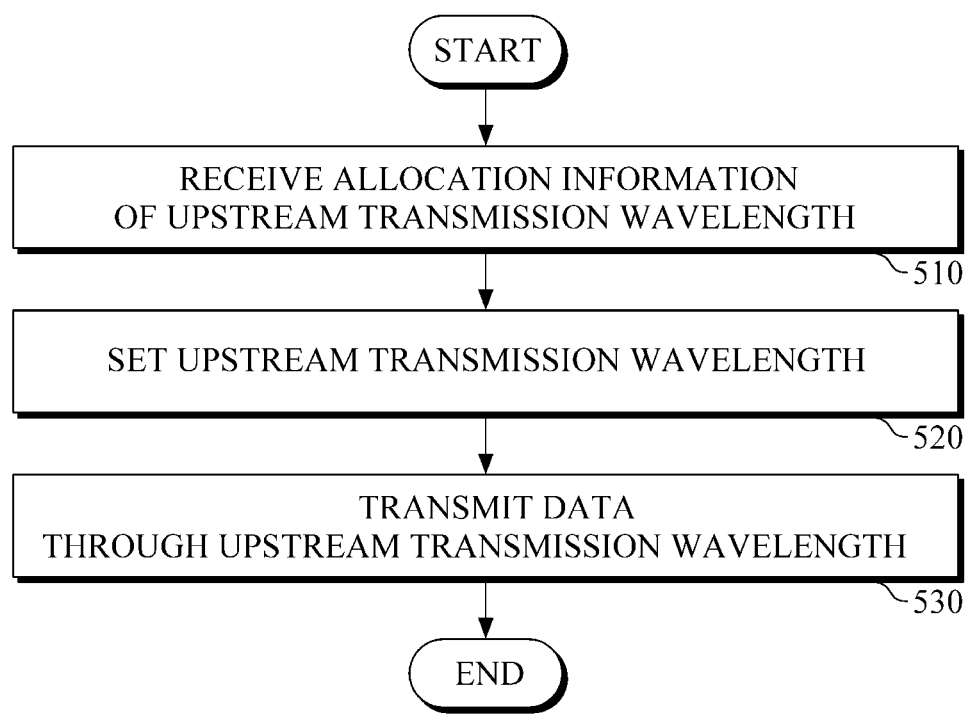
FIG. 5 is a diagram illustrating a method for setting an upstream transmission wavelength according to an embodiment of the present invention.

FIG. 5 is a diagram illustrating a method for setting an upstream transmission wavelength in an ONU according to an embodiment of the present invention.

With reference to FIG. 5, the ONU 200 receives upstream transmission wavelength allocation information from the OLT 100, in step 510. Further, the upstream transmission wavelength is set to a wavelength included in the received upstream transmission wavelength allocation information, in step 520.

The ONU 200 transmits data through the set upstream transmission wavelength, in step 530.

Further, though not illustrated in the drawings, the ONU 200 may request allocation of an upstream transmission wavelength to the OLT.

While embodiments of the present invention have been described above, it will be understood by those of ordinary skill in the art that various modifications may be made therein without departing from the original characteristics of the present invention. The scope of the present invention is not limited to the embodiments described above but rather should be understood to include various embodiments that fall within scope of the appended claims.

What is claimed is:

1. An optical line termination, comprising:
   a wavelength splitter configured to split upstream optical signals with different wavelengths, received from a plurality of optical network units, according to wavelength;
   at least one receiver configured to receive the optical signals split by the wavelength splitter according to wavelength;
   a wavelength selector configured to allocate an upstream transmission wavelength of the optical network units, wherein the wavelength selector calculates a value of a transmission distance to an optical network unit to which an upstream transmission wavelength is to be allocated, compares the calculated value with values of existing transmission distances of the optical network units according to upstream transmission wavelength to obtain differences between the calculated value and the value of existing transmission distances, and selects an upstream transmission wavelength for which the comparison yields a smallest difference; and
   a transmitter configured to transmit wavelength allocation information allocated by the wavelength selector to the optical network units.

2. The optical line termination of claim 1, wherein the transmitter performs wavelength conversion.

3. The optical line termination of claim 1, wherein the wavelength selector allocates an upstream transmission wavelength of a corresponding optical network unit in response to a request for wavelength allocation through a predetermined upstream transmission wavelength from at least one optical network unit to which an upstream transmission wavelength has not been allocated.

4. The optical line termination of claim 1, wherein the wavelength selector allocates an upstream transmission wavelength to a specific optical network unit in response to an external request for a wavelength allocation change.

5. The optical line termination of claim 1, wherein the wavelength selector selects an upstream transmission wavelength to be allocated according to network state information of an optical network unit.

6. The optical line termination of claim 5, wherein the network state information includes at least one of a quantity of transmission bandwidth currently in use according to wavelength, a position of a corresponding optical network unit and distance information.

7. The optical line termination of claim 1, wherein the optical network units comprise:
   a receiver configured to receive upstream transmission wavelength allocation information from the optical line termination;
   a wavelength setting unit configured to set an upstream transmission wavelength of a transmitter to a wavelength included in the upstream transmission wavelength allocation information received by the receiver; and
   an optical network unit transmitter configured to transmit data through the upstream transmission wavelength set by the wavelength setting unit.

8. The optical line termination of claim 7, wherein the wavelength setting unit requests allocation of an upstream transmission wavelength from the optical line termination through the transmitter.

9. The optical line termination of claim 7, wherein the optical network units further comprise:
   an optical network unit wavelength splitter configured to transmit a downstream wavelength signal transmitted through a single optical fiber to the receiver, and transmit data output from the transmitter in an upstream wavelength signal through the optical fiber.

10. A method of allocating an upstream transmission wavelength of at least one optical network unit in an optical line termination, the method comprising:
   selecting a wavelength to be allocated to the at least one optical network unit, wherein the selecting of the wavelength includes:
      calculating a value of a transmission distance to the at least one optical network unit to which the wavelength is to be allocated, and
      comparing the calculated value with values of existing transmission distances of the optical network units according to upstream transmission wavelength and selecting an upstream transmission wavelength for which the comparison yields a smallest difference;
   transmitting wavelength allocation information through an optical fiber to the at least one optical network unit;
   splitting upstream optical signals received through an optical fiber from the optical network units into optical signals according to wavelength; and
   receiving the plurality of signals split according to wavelength.

11. The method of claim 10, wherein the selecting of the wavelength includes selecting a wavelength by receiving a request for wavelength allocation through a predetermined upstream transmission wavelength from an optical network unit to which an upstream transmission wavelength has not been allocated.

12. The method of claim 10, wherein the assignment of the wavelength is characterized by the selection of an upstream transmission wavelength in response to a request from the optical network units in operation by an external input.

13. The method of claim 10, wherein the selection of the wavelength is characterized by the selection of an upstream transmission wavelength to be allocated according to network state information of a corresponding optical network unit.

14. The method of claim 10, wherein the method of allocating an upstream transmission wavelength of an optical network unit further comprises:
   the optical network unit receiving upstream transmission wavelength allocation information from the optical line termination;
   the optical network unit setting an upstream transmission wavelength to a wavelength included in the received upstream transmission wavelength allocation information; and
   the optical network unit transmitting data through the set upstream transmission wavelength.

15. The method of claim 14, further comprising:
   the optical network unit requesting allocation of the upstream transmission wavelength to the optical line termination.

* * * * *